United States Patent [19]

Beach et al.

[11] 4,102,462

[45] Jul. 25, 1978

[54] TIP DEVICE FOR A VACUUM CLEANER TANK

[75] Inventors: Rex E. Beach, El Paso, Tex.; Roland A. Blomgren, Glen Ellyn, Ill.

[73] Assignee: Service Master Industries, Inc., Downers Grove, Ill.

[21] Appl. No.: 817,965

[22] Filed: Jul. 22, 1977

[51] Int. Cl.² ............................................. B65G 65/34
[52] U.S. Cl. ........................................ 214/301; 4/1; 141/383
[58] Field of Search ............... 214/301, 302, 313, 314, 214/312, 315, 317; 15/257 A, 327 F; 141/311, 364, 383–386; 4/1; 294/32; 248/130, 133, 139; 220/85 H, 95, 96

[56] References Cited

U.S. PATENT DOCUMENTS

| | | | |
|---|---|---|---|
| 1,505,369 | 8/1924 | Brown | 294/32 |
| 2,595,752 | 5/1952 | Batts | 15/257 A X |
| 2,763,386 | 9/1956 | Winde | 214/302 |
| 3,063,082 | 11/1962 | Rosenberg | 15/327 F |

Primary Examiner—Robert G. Sheridan
Attorney, Agent, or Firm—Allegretti, Newitt, Witcoff & McAndrews

[57] ABSTRACT

A device for supporting and stabilizing a cylindrical, open-topped container as the container is tipped to discharge its contents into a receptacle. The device includes a pivot member connected by spaced arms to a brace member, legs extending downward from the arms, and an elastic fastening member. The legs hook about a lip on the container, and in cooperation with the fastening member, which loops about a projection on the container, hold the brace member against a side of the container. The pivot member may then rest on the edge of the receptacle to provide a stable pivotal axis for tipping the container.

1 Claim, 5 Drawing Figures

TIP DEVICE FOR A VACUUM CLEANER TANK

BACKGROUND OF THE INVENTION

The present invention relates to a device to facilitate tipping of a container, and more particularly, to a device for supporting and stabilizing a water-filled vacuum cleaner tank so that the tank may be tipped and emptied into a raised waste receptacle.

In the performance of many commercial and industrial cleaning services, such as carpet cleaning, a vacuum cleaner is used to collect both wet and dry wastes. Typically, such a vacuum cleaner has a cylindrical vacuum cleaner tank which stands from thirty to forty inches high and weighs from 65 to 80 pounds or more. The motor for such a vacuum cleaner may be incorporated in a removable lid. A tubular inlet, to which a vacuum hose is attached, usually projects from the sidewall of the vacuum cleaner tank near its upper rim. While in operation, fifteen to twenty gallons of water may be contained in the tank. Because of the great weight of the tank when filled, it may have wheels or casters to facilitate its movement.

To drain waste water, some vacuum cleaner tanks have drain valves in the bottom. However, a tank that does not have a drain valve, or that is being used where there is no floor drain, must be lifted and dumped into a waste receptable such as a sink or a toilet bowl. Because of the great weight of a water-filled tank and because of the instability of the container during tipping resulting from use of the wheels or casters on which it rests, lifting and dumping a tank without the aid of a mechanical device is disadvantageous. The tank may roll away from or off the side of the waste receptacle and fall to the floor, dumping its contents and damaging itself because of the force of the fall.

In the past, a variety of devices have been marketed for aiding the dumping of filled vacuum cleaner tanks and other containers. Such devices have wheeled stands and use various trunnion arrangements to which the tank is secured for vertical rotation. Such devices require that the person dumping the tank step on the stand, to keep the device from rolling downward and to counterbalance the rotational movement caused by the rotated tank. A vacuum cleaner incorporating such a device is disclosed in U.S. Pat. No. 3,063,082 issued Nov. 13, 1962, to E. N. Rosenburg and entitled "Suction Cleaner." While such devices have been useful in the past, as a consequence of their bulk and complexity, they require regular maintenance, tend to be costly and are usable only with specially built vacuum cleaner tanks.

Consequently, there has been a need for a simple and inexpensive device which guides against a receptacle into which the contents of a container are to be dumped, which causes the container to be safely and easily pivoted about the rim of the receptacle, and which simultaneously stabilizes the container against rolling away from or off the side of the receptacle.

SUMMARY OF THE INVENTION

In a principal aspect, the present invention is a device for supporting and stabilizing a container so that the container may be tipped and the contents of the container discharged into a raised receptacle. The device includes means for removably securing the device to the container and means for engaging the receptacle to provide an axis about which the container may be tipped. Attached to the means for engaging the receptacle are means for engaging the sidewall of the container while the container is being tipped to support and stabilize the container to prevent longitudinal and transverse movement of the container away from the receptacle.

It is thus a principal object of the present invention to provide a device which supports a container so that it may be tipped.

Another object is to provide a device which stabilizes the container when it is in the tipped condition.

A further object is to provide a device which provides a stable axis about which the container may be tipped.

A still further object is to provide a device which can be used with a filled commercial vacuum cleaner tank.

A further object is to provide a device which can be used with a toilet as the receptacle.

A still further object is to provide a device which can be used with a toilet without damaging the porcelain of the bowl rim.

Still further objects include the provision of a device which is readily manufactured, rugged, portable, and safe to operate.

These and other objects and advantages of the present invention will become apparent from the description of the preferred embodiment of the invention which follows.

BRIEF DESCRIPTION OF THE DRAWING

The preferred embodiment of the invention will be described in connection with the drawing, wherein.

DESCRIPTION OF THE PREFERRED EMBODIMENT

Figure 1:
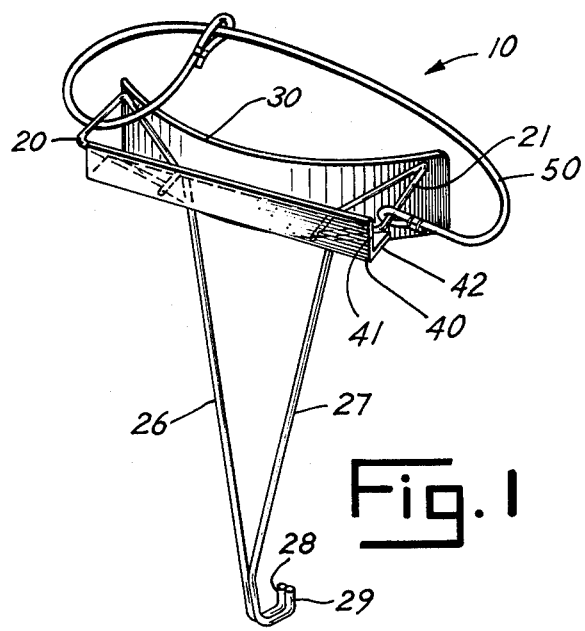
FIG. 1 is a perspective view of a preferred embodiment of the present invention.
Figure 3:
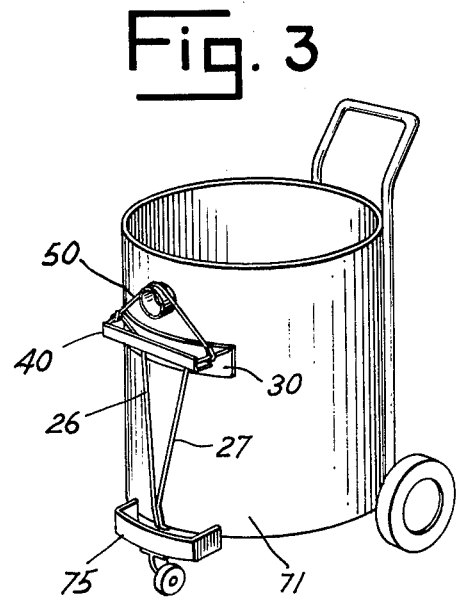
FIG. 3 is a perspective view of the embodiment of FIG. 1 attached to a typical vacuum cleaner tank.
Figure 4:
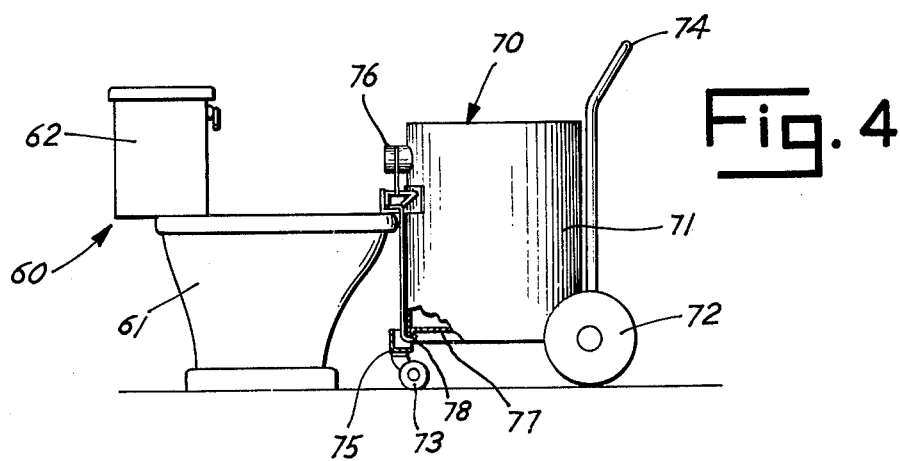
FIG. 4 is a partial section, side view of the embodiment of FIG. 1, attached to a typical vacuum cleaner tank and engaged against a typical toilet bowl.
Figure 5:
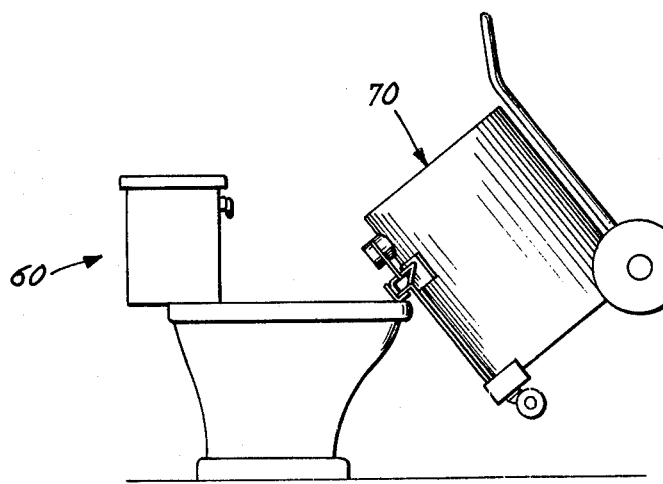
FIG. 5 is a side view of the embodiment of FIG. 1, attached to a typical vacuum cleaner tank which is in a tipped condition.

Referring to FIGS. 1–5, a preferred embodiment of the present invention is shown and generally designated as a device 10. As detailed in FIGS. 1 and 2, the device includes arms 20 and 21, legs 26 and 27, brace member 30, pivot member 40 and elastic member 50. As shown in FIGS. 3–5, device 10 is constructed to support and stabilize a container, such as an industrial or commercial vacuum cleaner tank, against a receptacle, such as a toilet.

For the purpose of illustration alone, a typical commercial vacuum cleaner tank 70 is detailed in FIGS. 3 and 4. As shown in FIG. 3, vacuum cleaner tank 70 is cylindrical, and includes a longitudinally extending cylindrical side wall 71, a bottom wall 77 and an open top. Side wall 71 extends below bottom wall 77 and thus a circumferential lip 78 is defined, which extends longitudinally below bottom wall 77.

Attached to vacuum cleaner tank 70 are a pair of fixed-axle wheels 72, a pair of casters 73, a handle 74, and a bumper 75. A tubular tank inlet 76 projects transversely from side wall 71 adjacent the top of the vacuum cleaner tank, and is adpated to receive a vacuum hose (not shown).

Also detailed in FIG. 3 for the purpose of illustration alone, a typical toilet 60 includes a porcelain bowl 61, a tank 62, and a seat (not shown). Bowl 61 has a curved bowl wall with a substantially oval upper portion, which defines an opening from the rim into the center of bowl 61.

Returning now to details of device 10, in the preferred embodiment, brace member 30 is formed of sheet metal and has the concave shape of a portion of a cylinder. The curvature of brace member 30 substantially equals that of side wall 71. Thus if brace member 30 is properly fitted against wall 71, vacuum cleaner tank 70 is stabilized against transverse or side-to-side movement upon tipped, with the aid of device 10. Vacuum cleaner tank 70 also has the loads and stresses which act upon it, while it is being tipped, distributed over substantially all the side wall 71 which is in contact with brace member 30.

Attached adjacent the opposite ends of brace member 30 are spaced arms 20 and 21. These arms 20 and 21, which will be described in detail below, may be welded to brace member 30, or fastened by any fastener of adhesives suitable for the materials used. If formed of plastic, arms 20 and 21 and brace member 30 could be integrally molded.

Attached to arms 20 and 21 is elongated and L-shaped pivot member 40. Pivot member 40 is elongated to contact the rim of toilet bowl 61 at two spaced points, thereby providing a stable pivotal axis about which vacuum cleaner tank 70 may be tipped. Pivot member 40 includes a substantially horizontal planar portion 42. Portion 42 engages the rim of toilet bowl 61 when vacuum cleaner tank 70 is pushed toward toilet bowl 61, as shown in FIG. 4. Pivot member 40 also includes a substantially vertical planar portion 41, which engages the rim of the bowl when vacuum cleaner tank 70 is tipped to a substantially horizontal position.

To protect the porcelain of toilet bowl 61, pivot member 40 is made of hard plastic, or any other non-abrasive material. So that arms 20 and 21 may be readily joined to pivot member 40, elongated metal attachment strips 43 and 44 are riveted to the inner faces of portions 41 and 42, respectively.

Turning now to the details of arms 20 and 21, in the preferred embodiment, arms 20 and 21 are shaped and positioned to transfer the load effectively. That is, each arm 20, 21 has a generally trapezoidal shape, and each arm 20, 21 lies in a plane which is substantially perpendicular to portion 41 of pivot member 40, and which forms an acute angle with portion 42 thereof.

Figure 2:
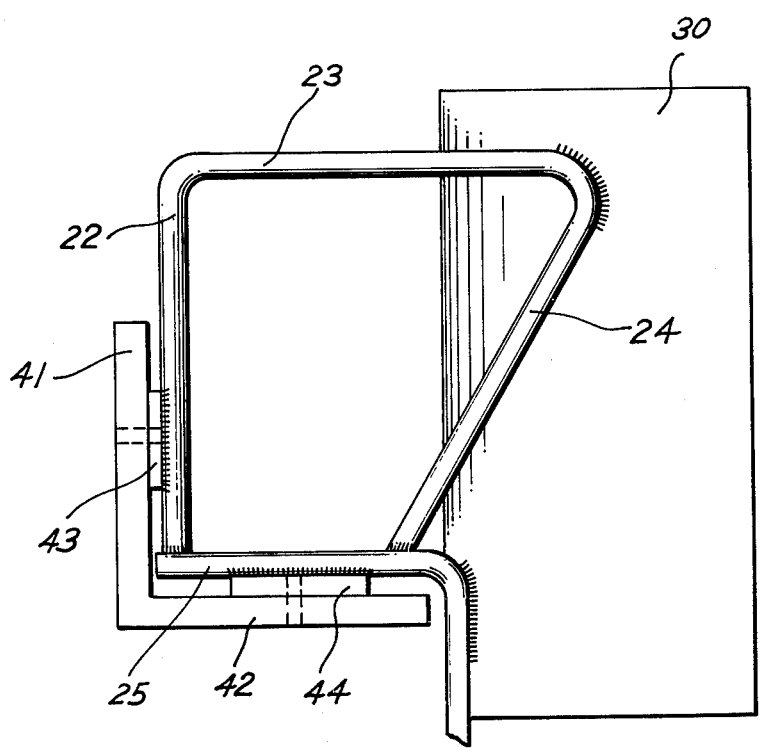
FIG. 2 is a side view of the embodiment of FIG. 1.

Arms 20, 21 are preferably formed of steel rod. One length of rod is cut and shaped to integrally form three sides of an arm 20, 21 as shown in FIG. 2. Specifically, the shorter of the non-parallel sides of the arm 20, 21, side 22, is integrally formed with the longer of the parallel sides, side 23, and with the longer of the non-parallel sides, side 24. A second length of rod forms the shorter of the parallel sides of the arm 20, 21, namely side 25. Thus, two lengths of rod are welded together at two points along side 25 to form an arm 20, 21.

As further shown in FIG. 2, each arm 20, 21 is welded to attachment strips 43 and 44. Side 22 is welded near its mid-point to attachment strip 43 and side 25 is welded near its mid-point to attachment strip 44. Each arm 20, 21 is also welded to brace member 30 along side 24 adjacent the curved portion of the arm which joins sides 23 and 24.

Integrally formed with side 25 of each of the arms 20 and 21, respectively, are legs 26 and 27. These legs have a length dependent on the height of the container to be dumped and the height of the receptacle. For the greatest ease in tipping the container legs 26 and 27 should be long enough so that pivot member 40 is at about the same height as the top of the receptacle when device 10 is in position on the container. If legs 26 and 27 are so sized, the container need not be lifted until the device 10 is engaged against the receptacle. Also, if the legs are so sized, device 10 has a further advantage. When used with the typical vacuum cleaner tank 70 and typical receptacle 60, device 10 provides a pivotal axis which is located such that vacuum cleaner tank 70 does not tend to pitch forward uncontrollably because of its own moment. In other words, the center of gravity of the filled vacuum cleaner tank 70 will not shift horizontally to a position substantially forward of the pivotal axis.

As stated above, arms 20 and 21 are welded to brace member 30. Legs 26 and 27 are also welded to brace member 30, along their upper ends, as shown in FIG. 2. At their lower ends, legs 26 and 27 are joined, as shown in FIG. 3. Legs 26 and 27 thereby form an isosceles triangle with pivot member 40, in which pivot member 40 is the base of the triangle. This shape distributes the weight of the filled vacuum cleaner tank 70 evenly between legs 26 and 27, thereby improving the stability of vacuum cleaner tank 70 when it is tipped.

At the lower ends of legs 26 and 27 are hooks 28 and 29, respectively, which engage lip 78 of vacuum cleaner tank 70. If vacuum cleaner tank 70 were of a type having no lip, hooks 28 and 29 could be replaced by straight extensions or a plate. In the preferred embodiment, hooks 28 and 29 curve behind lip 78 to prevent vacuum cleaner tank 70 from sliding down and away from waste receptacle 60, when the device 10 is fastened in place.

To keep device 10 secured to vacuum cleaner tank 70, a fastener 50 is provided. In the preferred embodiment, fastener 50 is a length of elastic cord, fastened at one end 51 to side 23 of arm 20, and at its other end 52 looped around side 23 of arm 21 and secured to itself. Cord 50 stretches to partially encircle the upper portion of tubular tank inlet 76. Cord 50 thus draws hooks 28 and 29 against lip 78 and holds brace member 30 against vacuum cleaner tank 70 because of the upward tension it exerts.

The device now fully detailed is utilized as follows. First the vacuum hose (not shown) is removed from tubular tank inlet 76. The lid (not shown) may also be removed to lighten the vacuum cleaner tank 70. Vacuum cleaner tank 70 is then moved close to the open waste receptacle 61. Device 10 is then fastened into place against the vacuum cleaner tank 70, with hooks 28 and 29 under lip 78 and fastener 50 stretched about tubular tank inlet 76. Vacuum cleaner tank 70 is then moved to the position shown in FIG. 4, with portion 42 of pivot member 40 positioned against the rim of bowl 61.

Standing behind vacuum cleaner tank 70, a person can thus tip vacuum cleaner tank 70 upward, and pivot it about pivot member 40, as shown in FIG. 5. Pivot member 40 should be well engaged on both sides of the rim of bowl 61 to insure stability. By pivoting the vacuum cleaner tank slowly upward about pivot member 40, the waste liquids and solids can be caused to dump into the bowl without splashing or overrunning.

Once the dumping is completed, the vacuum cleaner tank can be lowered, and the device stored in a convenient tool carrier for use when next needed.

From the foregoing, it should be apparent to those having skill in the art that various modifications and changes could be made in the design of the tip device. Thus the preferred embodiment of the present invention is to be considered in all respects as illustrative and not restrictive. All changes which come within the meaning and range of equivalency of the claims are intended to be embraced therein.

What is claimed is:

1. A device for supporting and stabilizing a container against a receptacle which defines an opening, so that the container may be manually tipped and the contents of the container discharged into the opening, said container having a longitudinal axis thereby defining longitudinal and transverse directions, said container including a longitudinally extending cylindrical sidewall and a transverse bottom wall, said sidewall extending longitudinally below said bottom wall, said sidewall and said bottom wall thereby defining a lip which extends below said bottom wall, said receptacle including a rim about said opening, said device comprising, in combination:

an elongated pivot member engageable against said rim to provide a transverse axis about which said container may be tipped;

spaced arms secured to said elongated angle member adjacent the ends thereof;

a brace member including a partially cylindrical curved surface, said brace member connected to the pivot member by the arms and adapted to contact said cylindrical sidewall along said curved surface;

a pair of elongated legs, each of said legs having an end attached to one of said arms and another end at which said legs are joined;

a pair of hooks joined to said legs at said joined end, said hooks engageable about said lip; and an elastic cord secured between said arms, said cord being securable to said container, whereby said cord may be attached to the container to draw said hooks against said lip and hold said brace member against said container in position for use.

* * * * *